United States Patent
Schönleber (10) Patent No.: US 10,731,965 B1
(45) Date of Patent: Aug. 4, 2020

(54) PHOSPHOR LIGHT SOURCE FOR CLS OR MULTIPOINT

(71) Applicant: PRECITEC OPTRONIK GMBH, Neu-Isenburg (DE)

(72) Inventor: Martin Schönleber, Neu-Isenburg (DE)

(73) Assignee: PRECITEC OPTRONIK GMBH, Neuisenburg (DE)

( * ) Notice: Subject to any disclaimer, the term of this patent is extended or adjusted under 35 U.S.C. 154(b) by 0 days.

(21) Appl. No.: 16/680,160

(22) Filed: Nov. 11, 2019

(30) Foreign Application Priority Data

Jul. 9, 2019 (DE) .................. 10 2019 118 600

(51) Int. Cl.
*G01B 11/06* (2006.01)
*G01B 11/02* (2006.01)
*G01J 3/28* (2006.01)
*G01J 3/02* (2006.01)

(52) U.S. Cl.
CPC ............ *G01B 11/06* (2013.01); *G01B 11/026* (2013.01); *G01J 3/0218* (2013.01); *G01J 3/2823* (2013.01)

(58) Field of Classification Search
CPC .................................. G01B 11/06; F21K 9/64
See application file for complete search history.

(56) References Cited

U.S. PATENT DOCUMENTS

| 10,228,551 | B1 | 3/2019 | Dietz | |
|---|---|---|---|---|
| 2003/0057380 | A1* | 3/2003 | Katagiri | G01T 1/20 250/484.5 |
| 2010/0019170 | A1* | 1/2010 | Hart | A61C 5/90 250/459.1 |
| 2017/0023730 | A1* | 1/2017 | Van Bommel | G02B 6/0076 |
| 2017/0329065 | A1* | 11/2017 | Sathian | G02B 6/0011 |
| 2018/0038680 | A1 | 2/2018 | Reolon | |
| 2018/0363858 | A1* | 12/2018 | Peeters | G02B 6/0003 |

FOREIGN PATENT DOCUMENTS

DE 102018114860 A 12/2019
WO 2016092348 A1 6/2016

* cited by examiner

*Primary Examiner* — Maurice C Smith
(74) *Attorney, Agent, or Firm* — Lempia Summerfield Katz LLC (57) ABSTRACT

A chromatic confocal measuring device for the measurement of distances and/or thicknesses of several locations has a light source that emits polychromatic measuring light through a light exit surface. The light source is a laser pumped luminophore-based light source and has an oblong exit surface. The measuring device further has at least one first confocal aperture through which the measuring light passes and which comprises a plurality of punctiform orifices or at least one slit-shaped orifice. The measuring device also includes imaging optics configured to cause a chromatic focus shift of the measuring light and to image the first confocal aperture in a measurement volume so that different wavelengths are focused at different heights. A first receiving and evaluating unit measures the intensity of the measuring light reflected by the measurement object as a function of the wavelength and of the transverse position of the reflection location on the measurement object and determines therefrom distances and/or thicknesses of several locations or of a region of the measurement object extending in at least one spatial direction.

11 Claims, 7 Drawing Sheets

PHOSPHOR LIGHT SOURCE FOR CLS OR MULTIPOINT

CROSS-REFERENCE TO RELATED APPLICATIONS

This application claims the benefit of priority to earlier German patent application no. 10 2019 118 600.5 filed on Jul. 9, 2019. The full contents of this earlier application are incorporated herein by reference.

BACKGROUND OF THE INVENTION

1. Field of the Invention

The invention relates to a chromatic confocal measuring device for the simultaneous measurement of distances and/or thicknesses of several locations or of a region of a measurement object, the region extending in at least one spatial direction.

2. Description of Prior Art

A chromatic confocal height measuring device, which has a plurality of measuring points arranged in a line in order to increase the measurement volume transverse to the optical axis, is known from WO 2016 092 348 A1.

The disadvantage of known measuring devices is that either light from a punctiform light source must be distributed over the entire measurement volume, which leads to a low intensity and thus to a restriction of the possible measuring rate, or a large plurality of punctiform light sources must be employed, which leads to high costs. Known light sources have too little output power to operate a chromatic confocal line detector with high frequency.

SUMMARY OF THE INVENTION

It is therefore the object of the invention to provide a cost-effective light source suitable for operating a chromatic confocal line detector with a high frequency.

This object is solved by providing a measuring device comprising a light source, which emits polychromatic measuring light through a light exit surface and at least one first confocal aperture through which the measuring light passes. The first confocal aperture comprises a plurality of punctiform orifices or at least one slit-shaped orifice. The measuring device also comprises an imaging optics configured to cause a chromatic focus shift of the measuring light and to image the first confocal aperture in a measurement volume, wherein different wavelengths are focused at different heights, as well as a first receiving and evaluating unit, which is designed to measure the intensity of the measuring light reflected by the measurement object as a function of the wavelength and of the transverse position of the reflection location on the measurement object and to determine therefrom distances and/or thicknesses of several locations or of a region of the measurement object, the region extending in at least one spatial direction. A luminophore-based light source is provided whose light exit surface is oblong.

A luminophore-based light source is understood as a light source in which a luminescent substance (luminophore) is excited by means of a pump source (typically a laser or an LED), the luminescent substance (luminophore) emitting light through a physical process, in particular phosphorescence, fluorescence or scintillation. Here, a luminophore is a radiation converting substance in general.

An oblong exit surface means that the surface is substantially longer in one direction than in the other, particularly by at least one order of magnitude.

Luminophore-based light sources are known per se, however none which would be suitable for this application.

According to an embodiment, a measuring device of the above mentioned type is provided, whose light source is a laser pumped luminophore-based light source and the exit surface of the light source is oblong. This has the advantage that the light source can illuminate the entire confocal aperture and thereby has a high efficiency and a high light output.

The first confocal aperture comprises a plurality of punctiform orifices or at least one slit-shaped orifice. In particular, the punctiform orifices are arranged in a row, preferably at regular intervals. In the case of punctiform orifices, this is a so-called multipoint sensor, which is configured to measure a series of points on the measurement object. In this case, the first confocal aperture can also be designed as the ends of a series of fibers, wherein each fiber end corresponds to a punctiform orifice. If the first confocal aperture comprises a slit-shaped orifice, then this is a so-called chromatic line sensor, which is configured to illuminate and measure a linear region on the measurement object. The density of the measurement locations in the linear region is dependent on the receiving and evaluating unit and its transversal resolution.

The first receiving and evaluating unit preferably comprises a spectrometer, which detects the intensities of received light as a function of the wavelength.

According to a preferred embodiment, the light source comprises at least one pump source, which emits pump light. The pump light is usually nearly monochromatic. Preferably, laser diodes are employed as pump sources due to the high achievable intensity. The pump light is converted into polychromatic light by a plurality of luminophores and the light subsequently passes through a homogenizer such that the intensity of the light exiting from the exit surface is distributed nearly evenly. Preferably, the homogenizer is designed as a thin plate, preferably made of glass, through which the light propagates substantially in a first spatial direction, while the plate acts as an optical waveguide in a second spatial direction, and the light can propagate in the third spatial direction and thus distribute evenly. This has the purpose of an even illumination across the measurement volume. Here, the luminophores can be approximately punctiform, or rather have a small volume.

A homogenizer of the described type can also be combined with all of the following embodiments.

According to a preferred embodiment, the light source comprises at least one pump source, which emits pump light, wherein the pump light is converted into polychromatic light by a rod-shaped luminophore. Light exiting through a lateral surface of the rod-shaped luminophore is advantageously used as measuring light. The lateral surface is thereby a surface, which extends over the length of the rod. This has the advantage that only one pump source and only one luminophore are needed to emit light over an oblong region, wherein the light is emitted from a continuous region instead of from several point sources.

The rod-shaped luminophore can thereby have a base surface (and cross-section) of any shape, e.g. circular or polygonal. The base surface is the surface at one end of the rod. The geometric shape is therefore preferably a cylinder or a prism whose height is significantly greater than the diameter of the base surface.

Preferably, the light enters through one of the base surfaces of the rod-shaped luminophore. Another advantageous possibility is to pump from both base surfaces of the rod-shaped luminophore, which improves the light output and makes the radiation at least partially more even over the rod length.

Alternatively, pump light enters through a lateral surface of the luminophore. In this case, either several pump sources are employed over the length of the rod-shaped luminophore, or pump light from a single pump source is focused onto a line portion at the location of the luminophore, for example by means of focusing optics with a cylindrical lens.

Advantageously, the rod-shaped luminophore is designed such that it acts as a light waveguide for the pump light and/or the measuring light. This is mainly achieved by the choice of the surface finish (smooth surface) and a small diameter (typically approximately 5 μm or approximately 50 μm, depending on the desired type of optical waveguide).

LED luminophores usually have medium path lengths in the range of 0.2 mm to 0.5 mm for absorption and frequency shifted light emission. In the case of approximately punctiform light sources, the pump light must be held in a small illumination range below 100 μm by multiple light scattering at grain boundaries to obtain a light spot small enough for the punctiform distance measurement. With the rod-shaped luminophore, the pump light can be guided linearly and scatter-free as in a single or multimode fiber (optical waveguide).

According to a particularly preferred embodiment, the light source comprises a slit diaphragm, wherein the slit of the slit diaphragm is the light exit surface of the light source. At the same time, the slit can serve as the first confocal aperture of the measuring device. Light, which is not directed through the exit surface, is advantageously shielded by the diaphragm so as not to influence the measurement.

According to a particularly preferred embodiment, the slit diaphragm is tilted relative to the longitudinal axis of the rod-shaped luminophore. This has the advantage that an uneven emission of light over the length of the luminophore can be at least partially compensated for, since, as a percentage, more light passes through the part of the slit diaphragm closer to the luminophore than through the part farther away. Therefore, the slit diaphragm is advantageously tilted such that it is closer to a region of the luminophore which emits less light and farther away from a region of the luminophore which emits more light.

According to a particularly preferred embodiment, the end face surface of the rod-shaped luminophore opposite an entry surface through which the pump light enters the luminophore is of a mirrored design. This has the effect that pump light, which passes completely through the luminophore, is reflected at the end and passes through the luminophore again. This results in a higher output and a more even radiation.

According to a particularly preferred embodiment, the luminophore is designed conically, particularly as a truncated cone or cone. This results in a more even light output. The entry surface here is preferably the larger base surface of the truncated cone, or through the base surface of the cone respectively. Advantageously, the conical luminophore is designed such that it acts as an optical waveguide for the pump light. As a result, the pump light is concentrated in the narrower part of the cone/truncated cone, which leads to a higher output per volume unit.

According to a particularly preferred embodiment, the light source comprises a parabolic mirror. The parabolic mirror focuses light, which does not leave the luminophore in the direction of the exit surface of the light source, at least partially in the direction of the exit surface and thus allows a higher output.

According to a particularly preferred embodiment, a part of the outer surfaces (a part of the lateral surface/lateral surfaces and/or at least one base surface) of the rod-shaped luminophore is of a mirrored design, wherein the desired exit surface is not of a mirrored design. This results in a higher light output, since radiation, which is not emitted in the direction of the light exit surface, is mirrored at least partially in the direction of the light exit surface.

Advantageously, the luminophore consists of a mixture of various luminophore substances, which emit light of various wavelengths. This leads to a wider polychromatic spectrum. Occasionally, an effect of secondary luminescence exists, when light of a first emission wavelength excites another luminophoric substance, which emits light of a greater emission wavelength.

A homogeneous mixture of the various luminophoric substances is preferred.

Preferably, the mixing ratio of the different luminophoric substances is changed over the length and/or over the radius of the rod-shaped luminophore. This allows the effects of secondary emission to be exploited or compensated for. A layer composition with pure layers of different substances is also possible.

Advantageously, the luminophore consists either of a single crystal or of pressed powder.

According to a preferred embodiment, the measuring device comprises a second receiving and evaluating unit designed to capture an image of the measurement object. This is particularly designed as a so-called chromatic camera, which takes advantage of the various focal positions of the various wavelengths on the object in order to produce an image with an improved depth of field.

According to a preferred embodiment, the measuring device comprises second imaging optics, which are designed spatially separate from the first imaging optics, wherein the first imaging optics and the second imaging optics each comprise an additional optical element which causes a chromatic focus shift transversely to the optical axis of the respective imaging optics.

In the following, embodiments of the invention are explained in more detail based on the figures. Identical reference marks thereby refer to identical or corresponding elements.

DETAILED DESCRIPTION OF PREFERRED EMBODIMENTS

Figure 1:
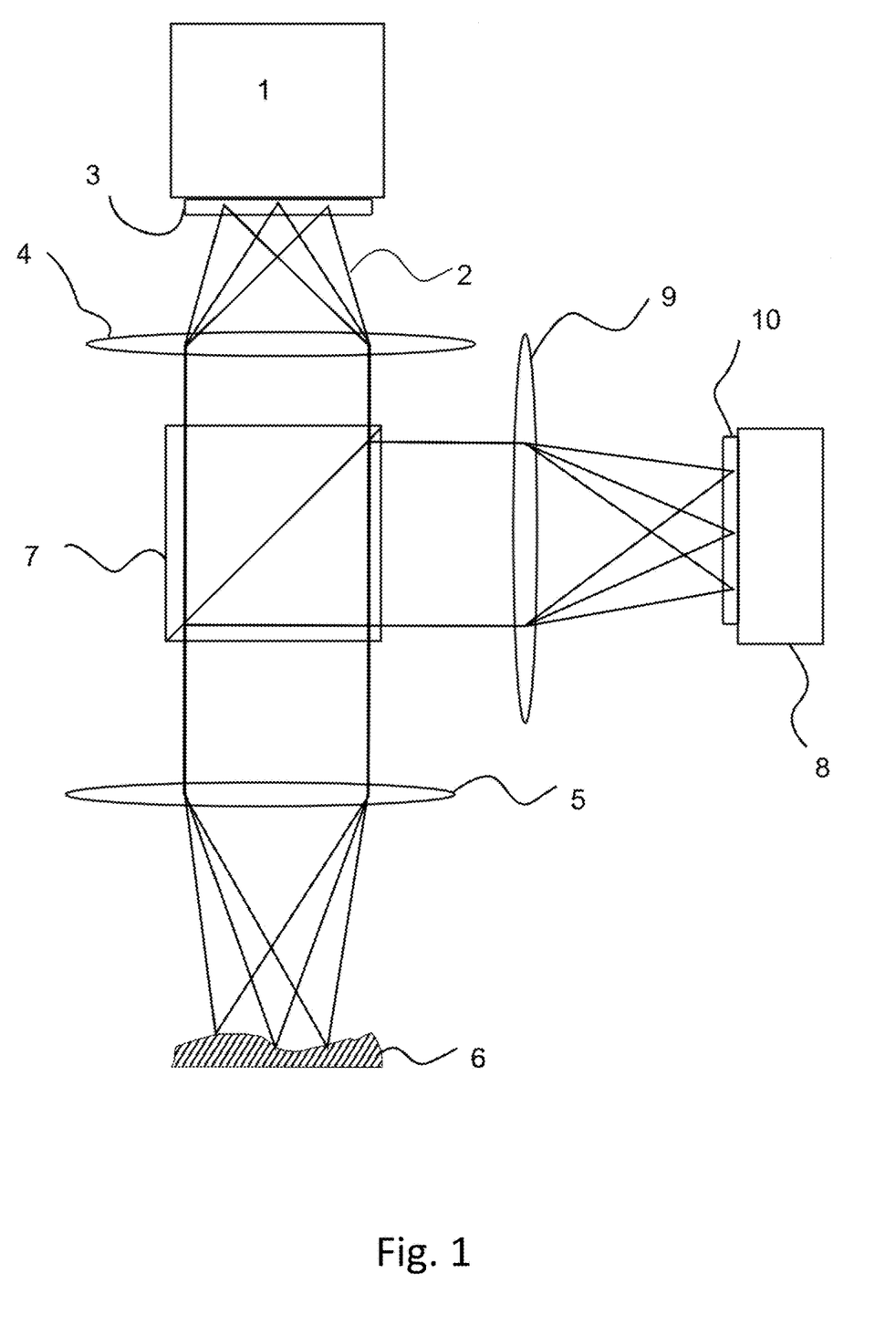
FIG. 1 shows a schematic illustration of a chromatic confocal measuring device.

FIG. 1 shows a schematic illustration of a chromatic confocal measuring device. This comprises a light source 1, which emits polychromatic measuring light 2 through a light exit surface. The measuring light 2 passes through a first confocal diaphragm 3, which comprises a plurality of punctiform orifices or at least one slit-shaped orifice and acts as a confocal aperture. The first confocal diaphragm 3 is imaged onto a measurement object 6 by imaging optics, which here comprise the lenses 4 and 5. At least one component of the imaging optics, here lens 5 according to the example, thereby causes a chromatic focus shift, which results in light of different wavelengths being imaged at different heights along the optical axis of the imaging optics.

Measuring light 2 is reflected by the measurement object and passes through the lens 5 back into the imaging optics. This comprises, for example, a beam splitter 7, which directs a part of the reflected measuring light 2 in the direction of a first receiving and evaluating unit 8. The measuring light 2 is thereby imaged by a further lens 9 onto a second confocal diaphragm 10. According to the chromatic confocal principle, only light of such wavelengths, which were also focused on the surface of the measurement object 6, is imaged sharply onto the second confocal diaphragm 10. Light of these wavelengths passes through the second confocal diaphragm 10 with maximum intensity.

The first receiving and evaluating unit 8 measures the intensity of the measuring light reflected by the measurement object and passed through the second confocal diaphragm 10 as a function of the wavelength and the transverse position of the reflection location on the measurement object and determines therefrom distances and/or thicknesses of several locations or of a region of the measurement object 6, the region extending in at least one spatial direction.

FIGS. 2 to 8, 11 and 12 show advantageous designs of the light source 1.

Figure 2:
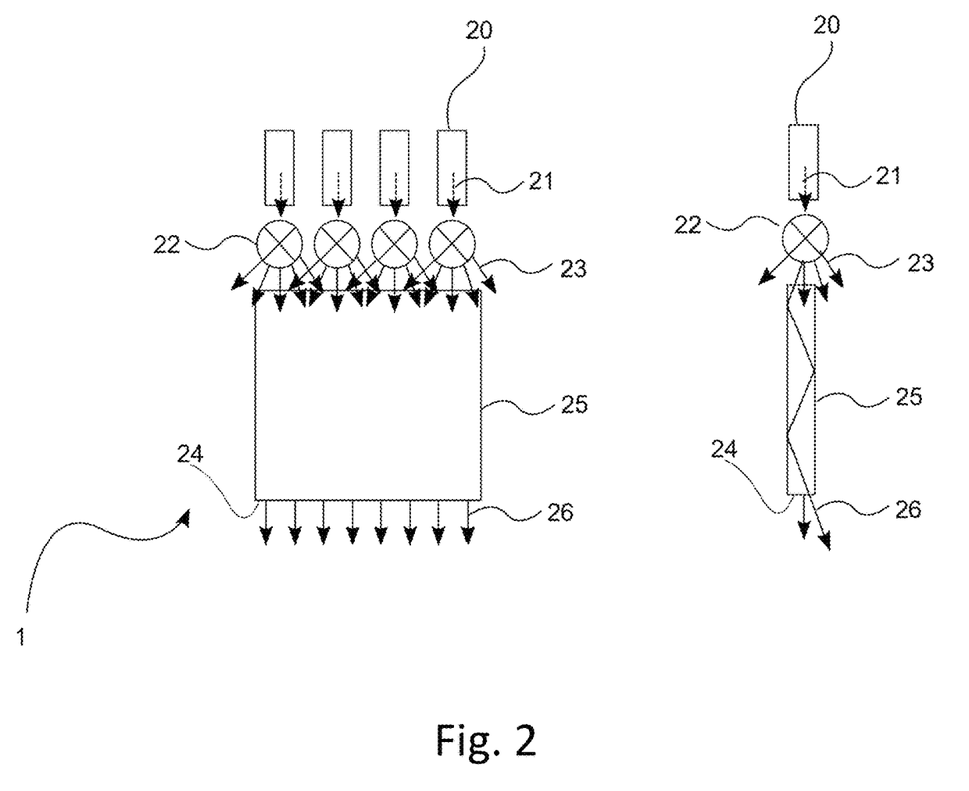
FIG. 2 shows a first advantageous design of the light source.

FIG. 2 shows a first advantageous design of the light source 1. The light source 1 according to the example comprises a plurality of pump sources 20 according to the example, for example laser diodes, which emit pump light 21 of a first wavelength. The pump light 21 is directed at a plurality of luminophores 22, which convert the pump light 21 into polychromatic light 23 by a physical process, for example. phosphorescence, fluorescence or scintillation. According to the example, the polychromatic light 23 comprises a spectrum of wavelengths, the wavelengths of the emission spectrum are typically greater than the wavelength of the pump light 21. The polychromatic light 23 can preferably comprise a part of the pump light 21 in addition to the emission spectrum.

In order to obtain an approximately even distribution of the emission intensity along the exit surface 24 of the light source 1, a homogenizer 25 is employed. The homogenizer 25 preferably consists of a thin glass plate, which acts as an optical waveguide in one spatial direction. The polychromatic light 23 is hereby advantageously directed in the direction of the exit surface 24 and is distributed nearly evenly along the extended dimension of the homogenizer 25. The light then exits as homogenized measuring light 26 out of the light exit surface 24.

Figure 3:
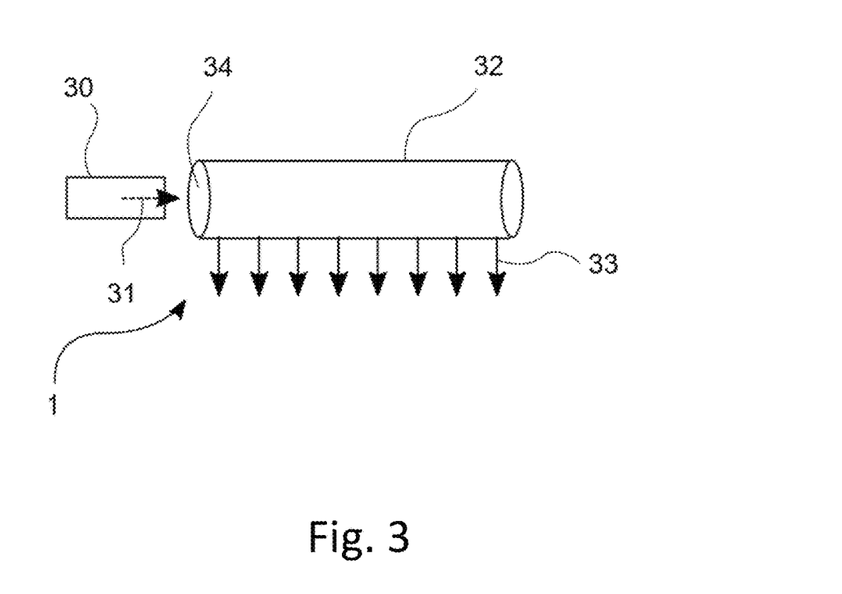
FIG. 3 shows a second advantageous design of the light source.

FIG. 3 shows a second advantageous design of the light source 1. The light source 1 according to the example comprises a pump source 30, for example a laser diode, which emits pump light 31 of a first wavelength. The pump light 31 is directed onto a rod-shaped luminophore 32, which converts the pump light 31 into polychromatic light 33 through a physical process, for example phosphorescence, fluorescence or scintillation.

The pump light 31 thereby enters preferably through a base surface 34 of the rod-shaped luminophore 32. This has the advantage that the pump light passes through the entire rod lengthwise so that as much pump light 31 as possible is converted.

The light 33 is used as measuring light, which exits from a lateral surface of the rod-shaped luminophore 32.

Figure 4:
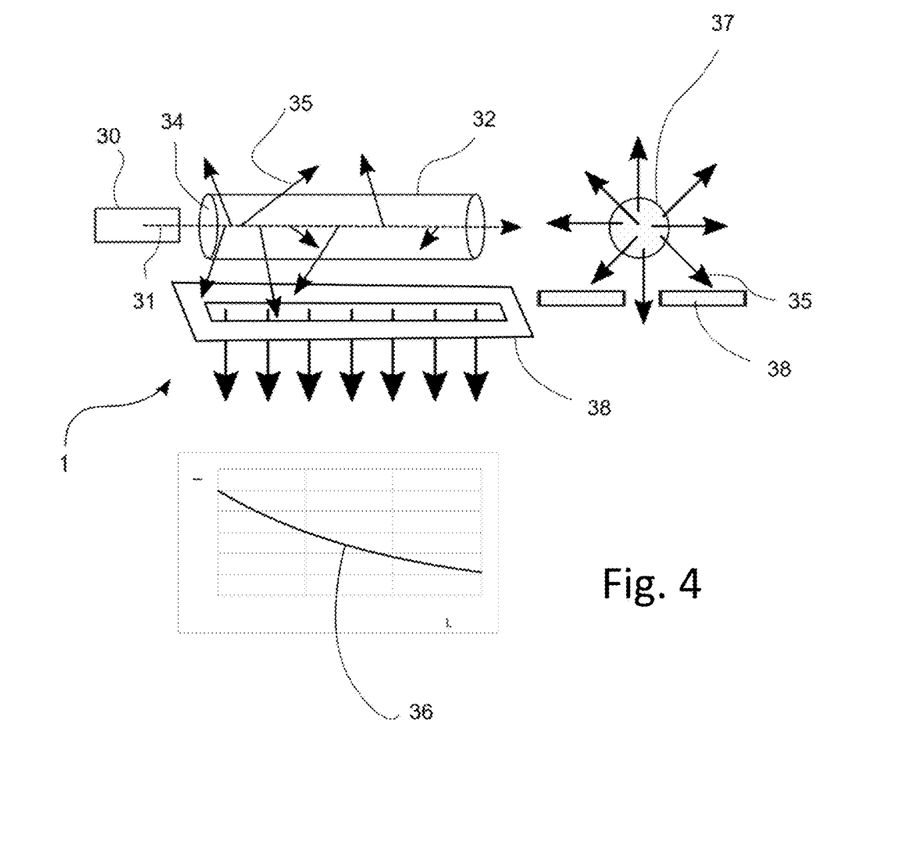
FIG. 4 shows a third advantageous design of the light source.

Due to the nature of the physical process (for example phosphorescence, fluorescence or scintillation), the light is usually not emitted evenly along the length of the rod-shaped luminophore. This is illustrated in FIG. 4. Typically, the most light is emitted near the entry surface 35, wherein the emission decreases exponentially over the length, as illustrated by the chart line 36. In addition, the emission is approximately homogeneous in all spatial directions and not only directed in the direction of the exit surface used. The view from the end face surface 37 shows the radial emission distribution. A slit diaphragm 38, for example, is employed to ensure that light only exits along the desired light exit surface. The direction of the longer extension of the orifice corresponds to the longitudinal direction of the rod-shaped luminophore 32.

Several advantageous possibilities of concentrating the light in the direction of the exit surface of the light source and homogenising it in the direction of the oblong extension are shown below. The individual measures can be advantageously combined with each other.

Figure 5:
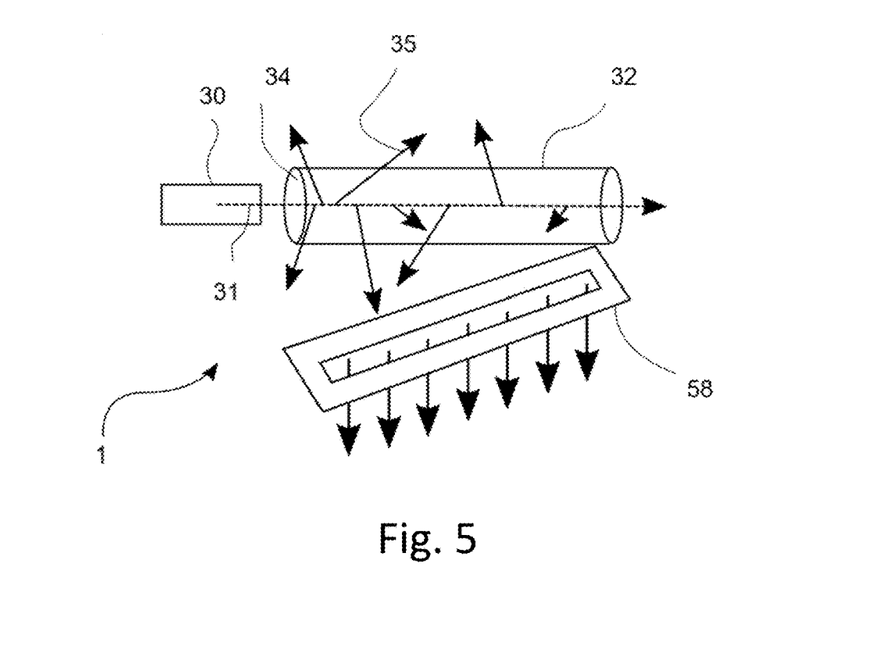
FIG. 5 shows a fourth advantageous design of the light source.

FIG. 5 shows such an advantageous possibility. Here, a slit diaphragm 58 is employed, which is tilted relative to the longitudinal axis of the rod-shaped luminophore 32. The slit diaphragm 58 is thereby farther away near the entry surface 34 of the luminophore 32 than near the opposite end face surface. As a result, a smaller proportion of the light emitted near the entry surface 34 passes through the diaphragm, so that the higher emission is at least partially compensated.

Figure 6:
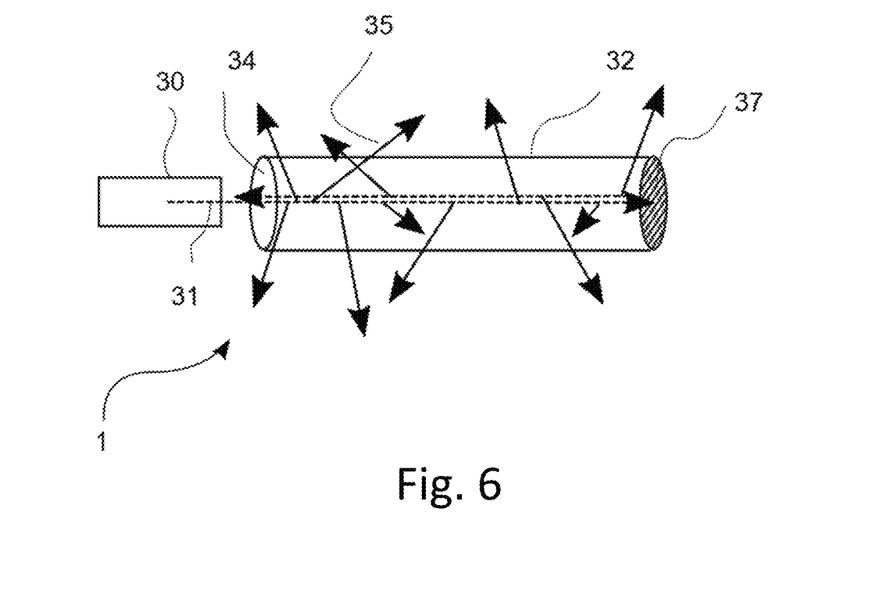
FIG. 6 shows a fifth advantageous design of the light source.

FIG. 6 shows a further advantageous form of design of homogenization. Here, the end face surface 37 of the rod-shaped luminophore 32 opposite the entry surface 34 is of a mirrored design, so that pump light 31, which completely passes through the luminophore 32, is mirrored here and passes through again in the opposite direction. The emissions along the way there and back partly complement each other, so that the differences in intensity are partly compensated.

Figure 7:
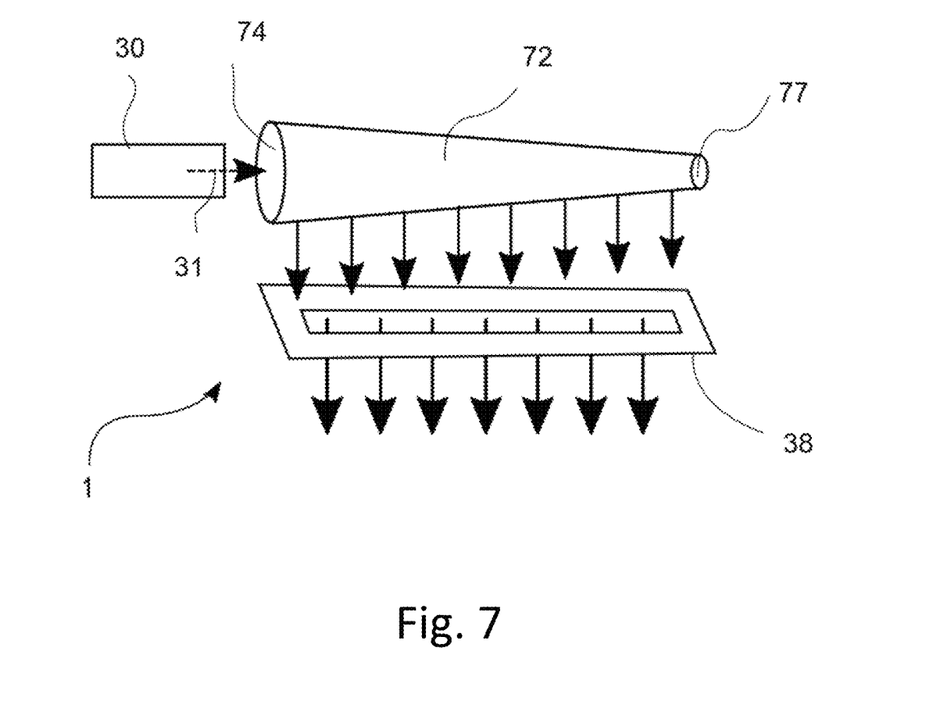
FIG. 7 shows a sixth advantageous design of the light source.

FIG. 7 shows a further advantageous form of design of homogenization. Here, the luminophore 72 is designed as a truncated cone. The end face surface 77 opposite the entry surface 74 is designed smaller than the entry surface 74. Since the luminophore functions as a waveguide for the pump light 31 due to the high refractive index, the pump light 31 is concentrated when passing through the luminophore 72 due to the decreasing cross-section. As a result, the emission per volume unit increases along the path, which at least partially compensates for the decreasing emission. The reduction of the pump light power along the path is responded to with a reduction of the cross-section so that the pump light intensity is kept at an even level.

Figure 8:
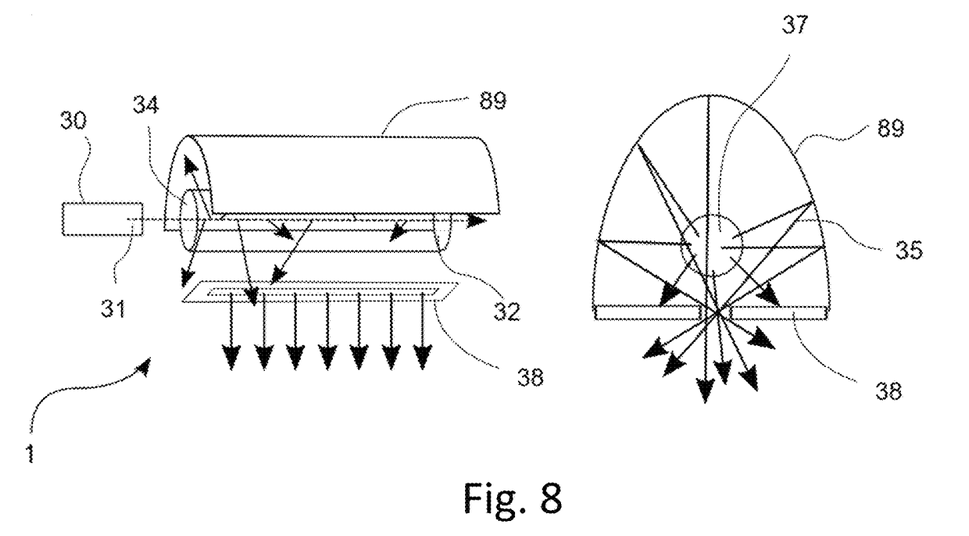
FIG. 8 shows a seventh advantageous design of the light source.

FIG. 8 shows a further advantageous form of design of the light source 1 for homogenization and concentration of the light. Here, the light source 1 comprises a parabolic mirror 89. The parabolic mirror is arranged such that at least a part of the light, which does not leave the rod-shaped luminophore 32 in the direction of the slit diaphragm 38, is mirrored in the direction of the slit diaphragm. Preferably, the parabolic mirror 89 is a parabolic trough, i.e. a parabolic shaped trough. In a section perpendicular to the trough axis, the concave boundary line is a parabola. Advantageously, the trough axis is parallel to the axis of the luminophore 32.

In an advantageous variant, the cross-section of the parabolic trough is changed over its length, in particular the trough is deeper at different locations, for example deeper at one end than at the other or deeper in the middle than near the ends.

Figure 9:
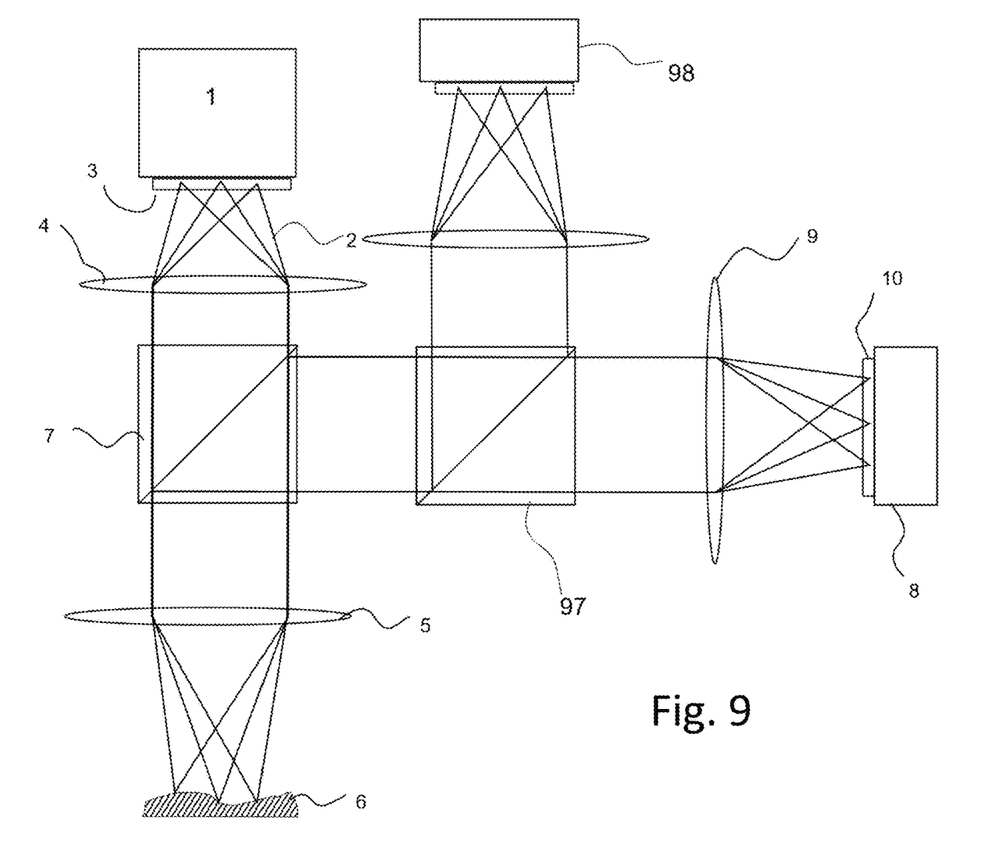
FIG. 9 shows a schematic illustration of an alternative chromatic confocal measuring device.

FIG. 9 shows a schematic illustration of an alternative chromatic confocal measuring device. The measuring device essentially corresponds to the measuring device shown in FIG. 1, except that a second beam splitter 97 is arranged between the first beam splitter 7 and the first receiving and evaluating unit 8. This second beam splitter 97 directs a part of the measuring light 2 reflected by the measurement object 6 to a second receiving and evaluating unit 98.

For example, the second receiving and evaluating unit 98 is an imaging unit, preferably a camera.

Figure 10:
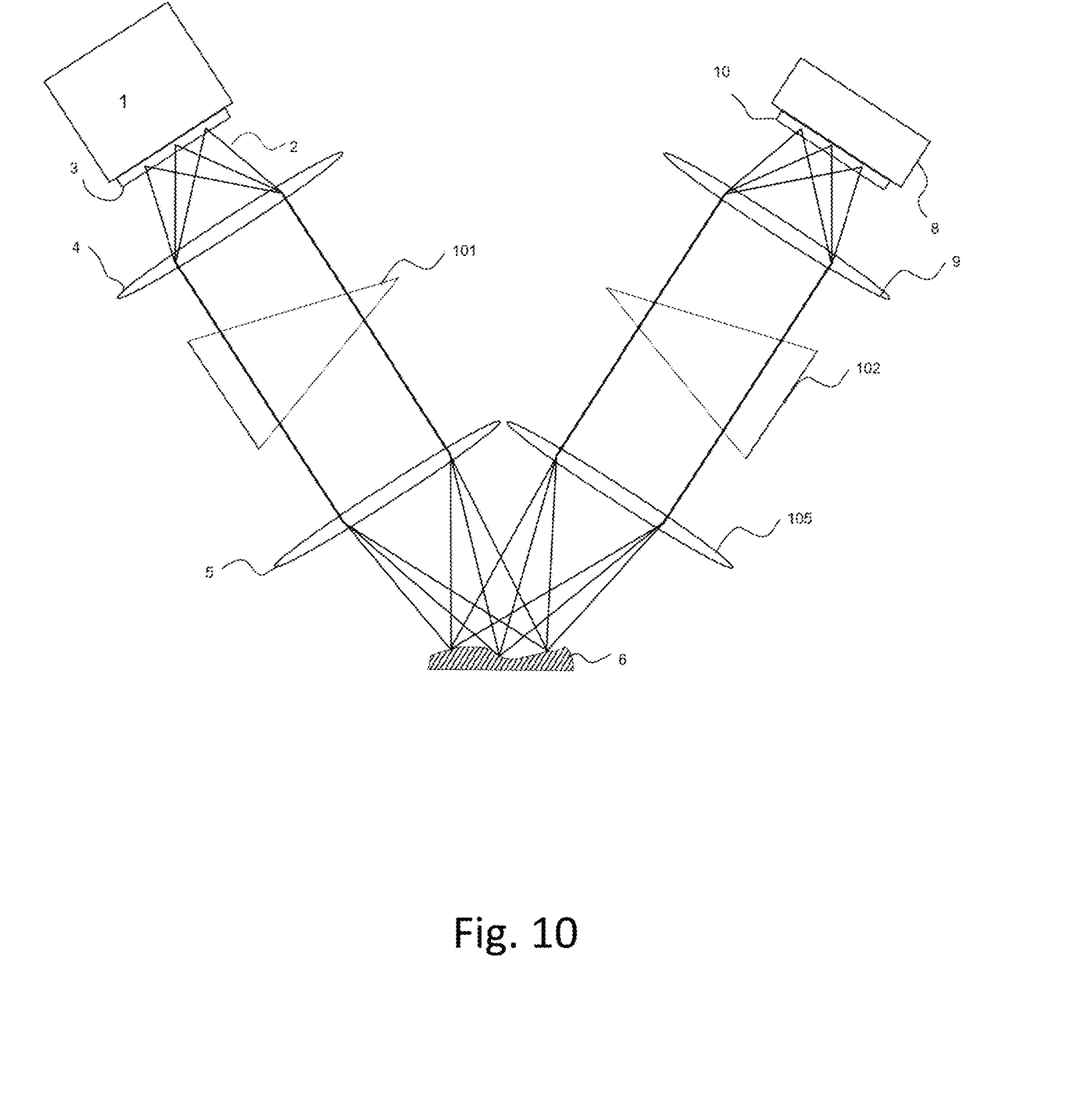
FIG. 10 shows a schematic representation of a further alternative chromatic confocal measuring device.

The chromatic confocal measuring device of FIG. 10, comprises, like that of FIG. 1, a light source 1, a first confocal diaphragm 3 and imaging optics comprising lenses 4 and 5 and an additional optical element 101, through which the measuring light 2 is directed onto the measurement object 6. The axis of the imaging optics is arranged obliquely to the average surface normal of the measurement object and the imaging optics are designed such that, in addition to the chromatic aberration along the axis of the imaging optics, a significant transverse chromatic focus shift occurs. This is preferably provided by the additional optical element 101. Accordingly, the measuring light 2 reflected by the measurement object 6 is captured at an angle by second imaging optics comprising lenses 105 and 9 and the optical element 102. Preferably, the second imaging optics are designed in mirror symmetry to the first imaging optics.

In accordance with the embodiment of FIG. 1, the measuring device comprises a second confocal aperture 10 and a first receiving and evaluating unit 8.

Figure 11:
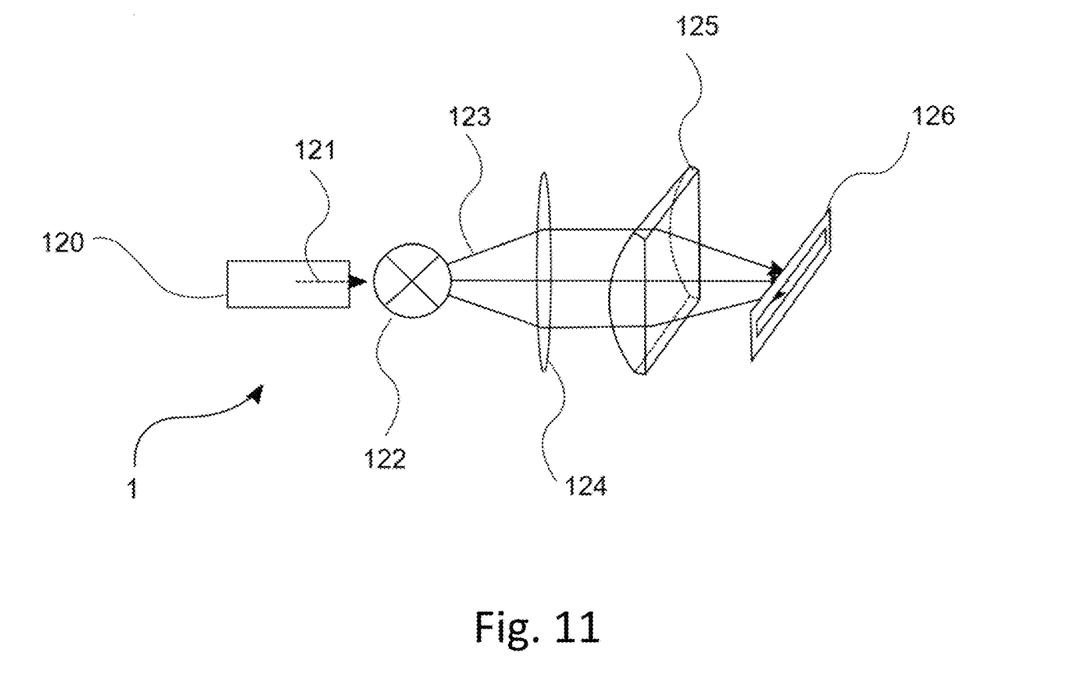
FIG. 11 shows an eighth advantageous design of the light source.

FIG. 11 shows a further advantageous design of the light source 1. The light source 1 according to the example comprises a pump source 120, for example a laser diode, which emits pump light 121 of a first wavelength. The pump light 121 is directed onto a luminophore 122, which converts the pump light 121 into polychromatic light 123 by a physical process such as phosphorescence, fluorescence or scintillation. According to the example, the polychromatic light 123 comprises a spectrum of wavelengths, the wavelengths of this spectrum are typically greater than the wavelength of the pump light 121. The polychromatic light 123 may preferably also comprise part of the pump light 121.

In order to direct the light 123 onto an oblong exit surface, it is first collimated by means of a preferably aspherical lens 124 and subsequently passes through a cylindrical lens 125, which focuses the light again on a line segment. Preferably, a slot diaphragm 126 is arranged at the location of the focus line, the slot orifice of the slot diaphragm 126 representing the oblong exit surface of the light source 1.

Figure 12:
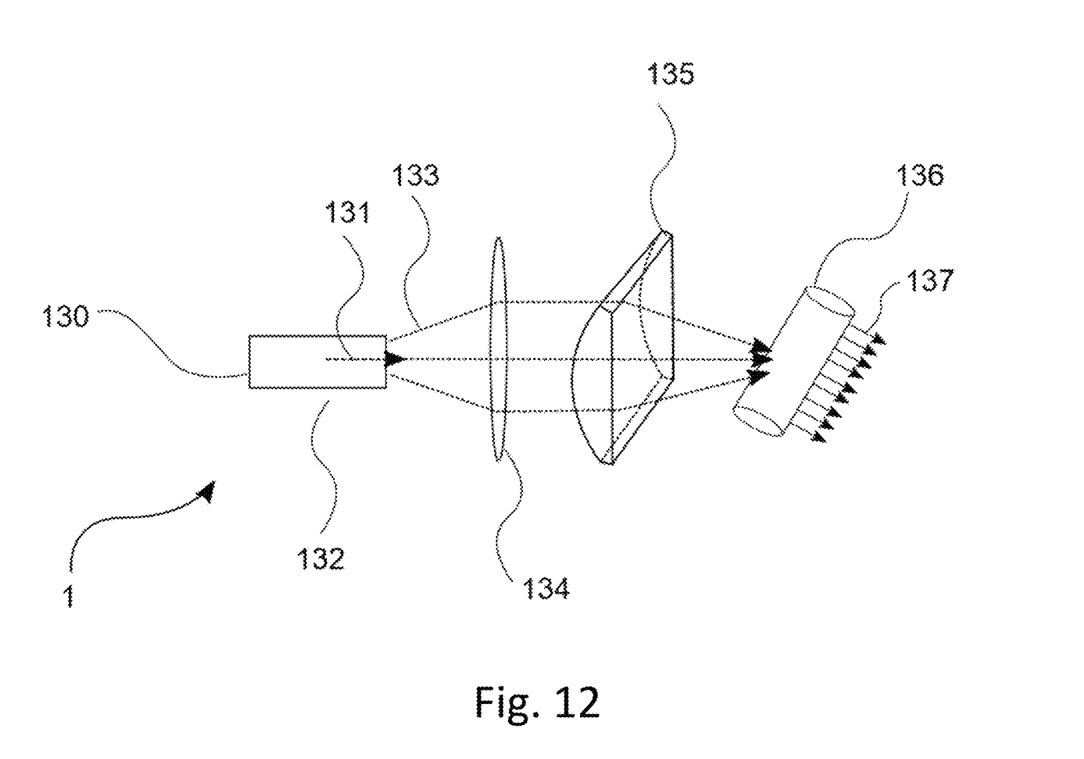
FIG. 12 shows a further ninth advantageous design of the light source.

FIG. 12 shows a further advantageous design of the light source 1. The light source 1 according to the example comprises a pump source 130, for example a laser, which emits pump light 131 of a first wavelength. The pump light 131 is first collimated by an aspherical lens 134 and then focused on a line segment by a cylindrical lens 135. At the location of the focus line, a luminophore 136 is arranged, which converts the pump light 131 into polychromatic light 137 by a physical process such as phosphorescence, fluorescence or scintillation.

The invention claimed is:

1. A chromatic confocal measuring device for a measurement of distances and/or thicknesses of several locations simultaneously or of a region of a measurement object, the region extending in at least one spatial direction, wherein the measuring device comprises:
   a light source configured to emit polychromatic measuring light through an oblong light exit surface, wherein the light source is a laser pumped luminophore-based light source;
   at least one first confocal aperture through which the measuring light is allowed to pass, wherein the first confocal aperture comprises a plurality of punctiform orifices or at least one slit-shaped orifice;
   imaging optics configured
      to cause a chromatic focus shift of the measuring light and
      to image the first confocal aperture in a measurement volume, wherein different wavelengths are focused at different heights; and
   a first receiving and evaluating unit configured
      to measure an intensity of the measuring light reflected by the measurement object as a function of wavelength and of a transverse position of a reflection location on the measurement object and
      to determine therefrom distances and/or thicknesses of several locations or of a region of the measurement object, the region extending in at least one spatial direction.

2. The measuring device of claim 1, wherein the light source comprises:
   at least one pump source configured to emit pump light;
   a plurality of luminophores configured to convert the pump light into polychromatic light; and
   a homogenizer configured to homogenize the polychromatic light such that an intensity of polychromatic light exiting from the exit surface is distributed at least approximately evenly.

3. The measuring device of claim 1, wherein the light source comprises:
   at least one pump source configured to emit pump light, and
   a rod-shaped luminophore configured to convert the pump light into polychromatic light, said rod-shaped luminophore having a lateral surface configured to emit the measuring light.

4. The measuring device of claim 3, wherein the light source comprises a slit diaphragm, wherein a slit of the slit diaphragm is the light exit surface of the light source.

5. The measuring device of claim 4, wherein the slit diaphragm is tilted relative to a longitudinal axis of the rod-shaped luminophore.

6. The measuring device of claim 3, wherein the rod-shaped luminophore has an entry surface through which the pump light enters, and an end face surface opposite the entry surface wherein the end face surface has a mirrored design.

7. The measuring device of claim 3, wherein the luminophore is designed conically.

8. The measuring device of claim 3, wherein the light source comprises a parabolic mirror.

9. The measuring device of claim 1, comprising a second receiving and evaluating unit configured to capture an image of the measurement object.

10. The measuring device of claim 1, comprising second imaging optics spatially separated from the first imaging optics, wherein the first imaging optics and the second imaging optics each comprise an additional triangular prism that causes a chromatic focus shift transversely to an optical axis of the respective imaging optics.

11. A chromatic confocal measuring device comprising:
a light source configured to emit polychromatic measuring light through an oblong light exit surface, wherein the light source is a laser pumped luminophore-based light source;
a confocal aperture comprising a plurality of punctiform orifices or at least one slit-shaped orifice;
imaging optics configured
to cause a chromatic focus shift of the measuring light and
to image the first confocal aperture in a measurement volume, wherein different wavelengths are focused at different heights; and
a receiving and evaluating unit configured
to measure an intensity of the measuring after reflection from the measurement object as a function of wavelength and of a transverse position of a reflection location on the measurement object and
to determine therefrom distances and/or thicknesses of several locations or of a region of the measurement object, the region extending in at least one spatial direction.

* * * * *